United States Patent [19]

Hendershot et al.

[11] 4,379,665
[45] Apr. 12, 1983

[54] INSULATION STRIPPER FOR COAXIAL CABLE

[75] Inventors: Homer Hendershot, Cogan Station; Charles M. Storrs, Williamsport, both of Pa.

[73] Assignee: Lemco Tool Corporation, Cogan Station, Pa.

[21] Appl. No.: 209,600

[22] Filed: Nov. 24, 1980

[51] Int. Cl.³ .............................................. B23B 51/04
[52] U.S. Cl. ................................... 408/204; 81/9.5 C
[58] Field of Search ................ 408/203.5, 204, 205, 408/206, 207, 67, 202; 81/9.5 R, 9.5 C

[56] References Cited

U.S. PATENT DOCUMENTS

| | | | |
|---|---|---|---|
| 1,567,812 | 12/1925 | Ober et al. | 81/9.5 |
| 2,942,501 | 6/1960 | Kallio | 408/206 |
| 3,086,410 | 4/1963 | Zimmerman | 408/206 |
| 3,533,313 | 10/1970 | Matthews | 81/9.5 |
| 3,543,614 | 12/1970 | Tibbeyt | 81/9.5 |
| 3,978,582 | 9/1976 | Maytham | 81/9.5 |

OTHER PUBLICATIONS

Advertisement Disclosing Cable Dielectric Coring Tool–Ben Hughes Communication Co.

*Primary Examiner*—Leonidas Vlachos
*Attorney, Agent, or Firm*—Thomas Hooker

[57] ABSTRACT

A stripping tool for removing annular insulation from between the conductors of a coaxial cable includes a stripping bit having a pair of longitudinally extending flutes, cutting edges at the head of the bit, a stop shoulder remote from the cutting edges having an outer diameter greater than the diameter of the head and a recessed connecting portion between the head and shoulder having a diameter less than the diameter of the head.

10 Claims, 5 Drawing Figures

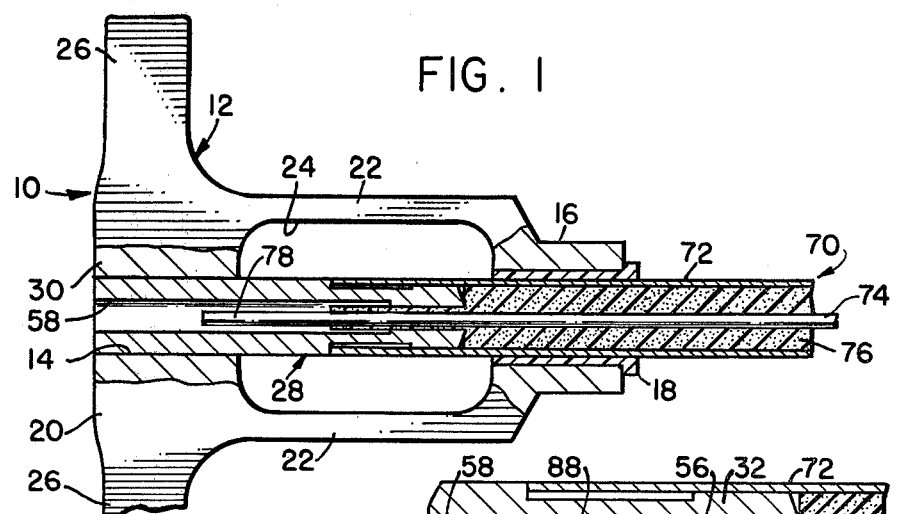
FIG. 1
FIG. 2
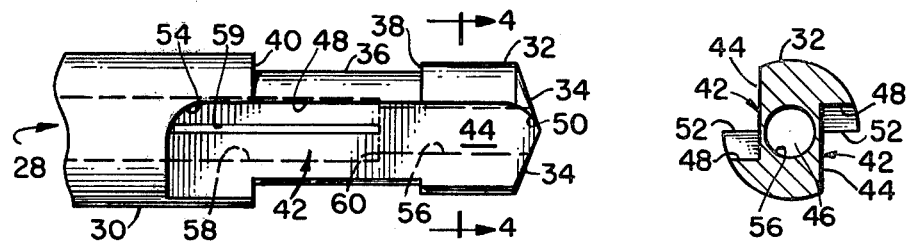
FIG. 3
FIG. 4
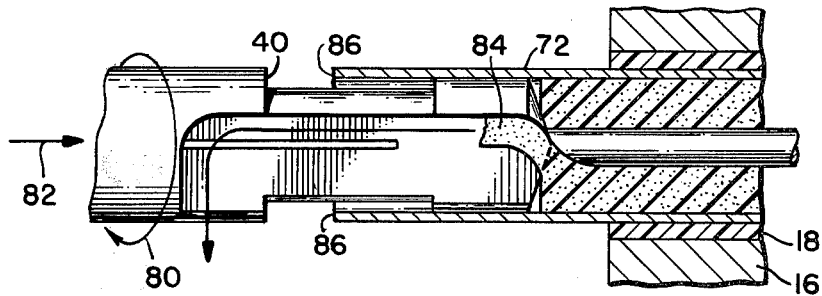
FIG. 5

INSULATION STRIPPER FOR COAXIAL CABLE

The invention relates to tools for stripping insulation from between the outer and inner conductors of a coaxial cable of the type used to transmit television, FM or other electrical signals. These cables have a relatively delicate outer sheath and an inner conductor core with the space between the core and the sheath filled by a foamed-plastic dielectric material. In order to attach the electrical connector to the end of the cable, it is necessary to strip or core out a portion of the insulation within the cable to allow a cylindrical portion of the connector to extend under the outer sheath so that the sheath can be subsequently clamped against the portion to form the desired electrical connection. The center conductor extends beyond the stripped sheath and is clamped to another portion of the connector.

Conventionally, coaxial cables of this type have been stripped or cored out using an auger-type tool similar to the tool of Ober et al U.S. Pat. No. 1,567,812. The tool now used to strip away insulation from modern coaxial cables includes a handle supporting a stripping bit with a cable aligning bushing axially spaced from the lead end of the bit. The bit includes a helical single flute having a single cutting edge at the lead end. The flute winds around a cylindrical hole which receives the central conductor of the cable. The cable to be stripped is piloted into the alignment bushing and held while the tool is rotated so that the cutting edge feeds into the insulation. The tool is self-feeding. Rotation without a driving force feeds the cutter into the insulation to cut away a single insulation strip. This strip is channeled into the relatively narrow flute. The high friction between the insulation and the sides of the flute jams the insulation in place so that during a single coring operation it may be necessary to retract the tool a number of times and manually poke the insulation out from the flute. This is a laborious and time-consuming operation.

The conventional tool includes a stop shoulder in the path of the cable sheath. When coring has been completed to the proper depth, the end of the sheath bottoms on the shoulder. Because the conventional tool is self-feeding and does not signal bottoming of the sheath, there is a tendency for the operator to continue rotating the tool after the sheath bottoms on the shoulder, thereby deforming the sheath radially outwardly of the shoulder. Such a deformed sheath cannot be readily withdrawn from the sliding fit bushing without further injury to the cable. In some cases, the sheath may be pulled out of the bushing without visible harm. The sheath, however, may be stressed sufficiently that future thermal loading, wind vibration and the like could completely break the sheath resulting in the cable pulling out from the connector. In some cases, it may be necessary to trim off the newly stripped sheath in order to remove the expanded end from the tool. This foreshortens the cable and requires restripping, both of which are highly undesirable.

The conventional stripping tool removes the insulation from the outer surface of the inner conductor so that any buckling of the inner conductor during or after the crimping operation risks the possibility of the inner conductor contacting the inner connector collar and shorting out the cable. This type of short is difficult to locate in a cable. In order to fix the short, the old connector must be removed, the cable restripped and a new connector must be attached.

The conventional stripping tool also leaves a thin layer of insulating material on the inner surface of the outer sheath, requiring the operator to strip away the insulation layer with a pen knife or similar device after the stripping tool has been withdrawn from the cable. This manual step slows down stripping and subjects the stripped cable end to forces likely to injure the relatively delicate exposed conductors.

The improved stripping tool of the present invention strips away the insulation from between coaxial cable conductors without jamming or overfeeding to deform the outer conductor. The stripping operation is hand-fed and automatically ends when the outer sheath bottoms on the stop shoulder and the cutting edges are held by the shoulder from stripping further into the cable. Stripping does not outwardly flare the sheath. Manual overfeeding is avoided by a torque-reduction signal when the outer sheath bottoms and by visual inspection indicating bottoming. Further rotation of the tool after bottoming spins the tool with respect to the cable and does not strip additional insulation.

The insulation is cut away by a pair of opposed cutting edges and flows along a pair of opposed longitudinal flutes outwardly of the tool and cable without jamming. The cable is stripped in a continuous operation. The tool need not be withdrawn during the stripping to clear the stripped insulation. The stripped coaxial cable is readily withdrawn from the alignment bushing without injury to the delicate exposed sheath.

During stripping, the stripping bit removes the insulation from the inside of the outer cable sheath to bare that surface for subsequent formation of an electrical connector with a connector mounted in the end of the cable. The bit leaves a thin insulating layer on the inner conductor to assure that any bowing of the inner conductor during crimping of the connector does not short-circuit the inner conductor to the outer conductor through the connector.

Other objects and features of the invention will become apparent as the description proceeds, especially when taken in conjunction with the accompanying drawings illustrating the invention, of which there is one sheet and one embodiment.

IN THE DRAWINGS:

FIG. 1 is a partially-broken away side view of an insulation stripper according to the invention;
FIG. 2 is an enlarged view of a portion of FIG. 1;
FIG. 3 is a side view of a bit used in the stripper;
FIG. 4 is a sectional view taken along the line of 4—4 of FIG. 3; and
FIG. 5 illustrates the stripping operation.

Insulation stripping tool 10 includes a body 12 having an axial bore 14 at one end and an axially aligned cable support bushing 16 at the opposite end. The body may be formed of a suitable material. If formed of a conductive material, an insulating sleeve 18 may be provided in bushing 16. Alternatively, the body may be coated with an insulating material. Body base 20 and bushing 16 are connected by a pair of ribs 22 located outwardly of the bore and bushing to define an enlarged opening 24. A pair of handles 26 extend from opposite sides of the base 20 and facilitate manual rotation of the stripper.

Insulation stripper bit 28, shown in FIGS. 3 and 4, includes a cylindrical shank 30 having a sliding fit within bore 14. Suitable means (not illustrated) secure the bit within the bore for rotation with the body. As shown in FIG. 1, the bit extends from base 20 across opening 24 nearly to bushing 16.

The bit includes a cylindrical head 32 having a lead end defined by a pair of like flat surfaces 34 intersecting at a shallow angle on a bit diameter. The diameter of head 32 is slightly less than the nominal internal diameter of the outer sheath of the coaxial cable stripped by the tool. The head is joined to the shank by a cylindrical connecting portion 36 having a diameter less than the diameter of the head. The diameter of the shank 30 is greater than the inside diameter of the cable sheath and preferably equal or greater than the outer diameter of the cable. Shoulders 38 and 40 join the ends of connecting portion 36 and head 32 and shank 30, respectively.

The bit 28 includes a pair of like longitudinally extending flutes 42, each formed from a cutout in the bit and including a flat bottom surface 44 extending from one side of the bit past the bit axis 46 to a perpendicular flute side wall 48 extending back to the bit surface. See FIG. 4. Surfaces 44 are parallel. The flutes 42 extend from head 32 past shoulder 40 and into the shank 30. The forward end of each wall 48 curves toward the bit axis 46 at 50 to reduce the metal beneath surface 34 and form a cutting edge 52. Edges 52 face in the direction of stripping rotation of tool 10 and may lie on a common bit diameter. See FIG. 4. The inner end of each side wall 48 extends into the shank 30, around a curve 54 and thence to the side of the bit. Each flute 42 extends into connecting portion 36.

Axial bore 56 extends through the head 32 and joins a large diameter axial bore 58 extending from shoulder 60 at the end of bore 56 to the end of the bit in base 20. Bore 58 extends nearly to head 32. Bore 58 intersects bottom walls 44 to form slits 59. As illustrated in FIG. 4, the flute bottom surfaces 44 are nearly tangent to bore 56.

Insulating stripper tool 10 is used to remove an end portion of the annular dielectric insulation separating the electrically conductive outer sheath from the axial conductor of a coaxial transmission cable. While the tool is primarily adapted for stripping insulation from cables of the type used to transmit television signals, it may be used to strip insulation from other types of cables.

Coaxial cable 70 includes an outer electrically conductive sheath 72 and an inner axial conductor 74. The sheath 72 may be a thin walled aluminum tube formed by an extrusion process or from a sheet of aluminum welded into a cylindrical configuration. The inner conductor may be formed of a suitable conductive material. Dielectric insulation 76 occupies the annular space between the sheath 72 and conductor 74. This insulation is conventionally a foamed plastic material having sufficient strength to locate the conductor 74 in the center of the cable and to provide the desired electrical separation or independence between the conductors.

Cable 70 transmits signals from a signal source to a signal receptor. In the case of CATV systems, the cables carry television transmission signals from signal sources to the customer through a series of splices, amplifiers, splitters and other elements dependent upon the design of the transmission system. In order to transmit a signal into or out of a length of cable 70, it is necessary to attach a connector to each end of the cable. The cable end is prepared for receiving a connector by severing the insulation and outer sheath from an end to expose a portion of the inner conductor beyond the sheath and then stripping or coring out the insulation between the sheath and conductor for a distance into the cable sufficient to receive an annular portion of the connector. An electrical connection is formed between the connector and sheath by forcing the sheath against the annular member. An electrical connection is formed with the central conductor by a suitable clamping or crimp connection.

Tool 10 strips or cores out the insulation at the end of the cable preparatory to attaching the connector. Following trimming back of the sheath and insulation to expose end 78 of the inner conductor, the end of the cable is piloted into the center opening of bushing 16 so that the cable is axially oriented with respect to the tool and conductor end 78 extends into bore 56. The diameter of the bore 56 is greater than the diameter of the conductor. Further extension of the cable into the bushing bottoms the bit end surfaces 34 on the end of the insulation. The diameter of bit head 32 is slightly less than the interior diameter of the sheath 72. Rotation of the tool in the direction of arrow 80 shown in FIG. 5 while an axial force in the direction of arrow 82 is applied to the tool feeds the cutting edges 52 into the insulation to sever a pair of diametrically opposed strips 84 from the insulation. With continued rotation, these strips are forced along wall 48 away from the cutting edges 52. Ultimately, the strips are guided along the flutes 42 beyond shoulder 40 and are ejected outwardly of the bit and tool through opening 24. The flutes guide the strips beyond the end 86 of sheath 72 to avoid any possible jams during stripping.

Rotation of the tool to cut away insulating strips 84 removes the main body of the insulation within the cable leaving a thin layer of insulation 88 surrounding the central conductor. The frictional engagement between this remaining insulation layer and the bit is reduced by the increased diameter of bore 58. Insulation 88 does not engage the sides of bore 58, with the result a low torque is required to rotate the tool during coring. This feature assures a steady maximum torque is required during coring, rather than a torque increasing with the depth of the coring operation. The constant coring torque or "feel" enables the operator to readily discern when the sheath has bottomed and the cable has been fully cored.

The diameter of head 32 is slightly less than the nominal interior diameter of the sheath 72 so that during coring a slight dielectric film may be left on the inside of the sheath. Bit 28 automatically removes this layer during coring and collects the layer in the flutes 42 and the recess at connecting portion 36. When coring is completed and the tool is removed from the cable, the interior surface of the conductor 72 is free of insulation and ready to receive the connector.

FIG. 5 illustrates a partially cored cable. Further rotation of the tool with respect to the cable cuts away additional insulation to deepen the cored end of the cable and move sheath end 86 toward shoulder 40. Engagement between the sheath and shoulder bottoms the tool to prevent further feeding of the edges 52 into the insulation and reduces the torque required to rotate the tool. The reduced torque is readily sensed by the operator as a signal that the coring operation is completed and the tool may be withdrawn from the cable.

Conventional coring tools having a single spiral cutter are self-feeding so that once the coring operation has been initiated rotation of the tool with respect to the cable feeds the cutting edge into the insulation and draws the cutter into the cable. The conventional tool does not provide the signal indicating the cable has been cored to the desired depth and the sheath has bottomed on a stop shoulder. Further rotation of such a tool after bottoming continues to draw the cable into the tool and deforms the end of the relatively delicate outer sheath radially outwardly at the stop. The deformation in the sheath prevents withdrawal of the cable from the alignment bushing. The deformed cable must be either "jerked" out from the bushing or the deformed end of the sheath must be cut off, the center conductor trimmed and the shortened cable again cored. Shortening of the cable causes a number of problems, particularly where the cable is originally cut to its desired length. The cable may have been already strung and may have to be spliced to provide additional length to permit the connector to mate with another circuit element, such as an amplifier or an additional length of cable. Such splices degrade the quality of the signal transmitted through the cable. There are additional labor costs associated with recoring or splicing the cable.

Sometimes it is possible to pull a slightly flared cable from an alignment bush. This disengagement frequently requires hard pulling and twisting of the cable relative to the tool. While the slightly deformed cable once removed from the tool may appear to be structurally sound, frequently the outer sheath has been severely weakened by the withdrawal process and in many cases such sheaths break or pop off thereby destroying the integrity of the cable and frequently breaking the cable away from the attached electrical connector. These problems are eliminated by use of the present tool because the cutting edges are not self-feeding and the tool provides a signal to the operator indicating when the coring operation has been completed.

Tool 10 cores out a cable in a continuous rotary operation commencing from first engagement between the cutting edges 52 and insulation and continuing until the end of the sheath 86 bottoms on shoulder 40 thereby preventing the cutting edges from severing further insulation from the cable. The cutaway strips 84 are smoothly guided down the longitudinal flutes and outwardly of the bit during coring. The area through which the strips are guided is defined by the flute surface and the interior surface of the outer conductor sheath 72 is greater than the area of the strips so that the foamed, flexible strips do not bind or jam within the flutes and the coring operation is continuous until the sheath bottoms.

In the drawings, bit 28 is held in a hand-rotated body 12. Alternatively, the bit may be mounted in a body having an alignment bushing similar to that of the tool but with a shank adapted to be secured in the chuck of an electric drill or similar device. In this way, the bit and body are rotated by a mechanical drive rather than by hand. The coring operation using this tool is performed in the same way as described in connection with the hand-held tool 10.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What I claim my invention is:

1. An insulation stripping tool for coaxial cable having a body with cable alignment means at one end and a stripping bit at the other end axially aligned with the means, the bit including a cutting end adjacent to the means with an insulation cutting edge and a sleeve stop surface away from the means, wherein the improvement comprises an axial bore extending into the bit from the cutting end and an insulation carrying flute on the surface of the bit extending longitudinally along the bit from the cutting edge past the sleeve stop surface, the cutting edge facing in the direction of stripping rotation of the tool, said flute including a bottom surface extending from one side of the bit past the bit axis and a side wall extending from the bottom wall to the surface of the bit, the side wall including a section extending longitudinally along the bit and a curved section at the cutting end of the bit running from one end of the longitudinal section to the cutting edge whereby upon stripping rotation of the tool and feeding of the bit into an end of a coaxial cable held by the means the cutting edge severs a strip of insulation from between the central conductor and the surrounding conductive sheath and the flute carries the strip away from the cutting edge, axially along the bit and outwardly the cable without jamming while the central conductor is fed into said bore.

2. An insulation stripping tool as in claim 1 wherein the diameter of the axial bore is increased away from the cutting end of the bit.

3. An insulation stripping tool as in claim 1 wherein the bit includes a cutting head carrying the edge, a shank and a connecting portion joining the head and shank, the outer surface of the head being shaped to conform to the inner surface of the cable outer sheath and the connecting portion being smaller than the head so as to collect an insulation layer left on the outer sheath following stripping by the edge, the end of the shank adjacent the connecting portion defining the stop surface.

4. An insulation stripping tool as in claim 1 wherein the bit includes a cylindrical cutting head carrying the edge, a cylindrical shank and a cylindrical connecting portion between the shank and head, the diameter of the head being equal or slightly less than the interior diameter of the outer sheath of coaxial cable stripped by the tool, the diameter of the connecting portion being less than the diameter of the head and the diameter of the shank being greater than the diameter of the head, and a stop shoulder between the connecting portion and shank defining said stop surface.

5. An insulation stripping tool as in claim 1 wherein the bit includes a second cutting edge like said cutting edge and a second flute like said flute, the cutting edges are diametrically opposed across the cutting end of the bit and face in the same circumferential direction, and the flutes extending longitudinally past the stop surface on opposite sides of the bit.

6. An insulation stripping tool as in claim 5 wherein the flute bottom surfaces are essentially tangent to the first portion of the bore.

7. An insulation stripping tool as in claim 6 where the second portion of the bore intersects the bottom surfaces to define a pair of longitudinal slits.

8. An insulation stripping tool for a coaxial cable comprising a body, a cable alignment bushing at one end of the body, a holder for a bit at the other end of the body, ribs joining the ends of the body, a stripping bit secured within the holder in axial alignment with the bushing including a cutting end adjacent the bushing, a circumferential sheath stop surface away from the bushing wherein the improvement includes a cylindrical head at the cutting end of the bit having a first diameter, a connecting portion between the head and the stop surface having a diameter less than the diameter of the head, the head including a pair of opposed cutting edges facing the same circumferential direction, a pair of longitudinal flutes formed in and extending along the length of the bit, each flute including a first wall having a longitudinal portion extending past the stop surface at one end and a curved portion at the other end extending to the edge, and an axial bore extending into the bit from the cutting end.

9. An insulation stripping tool as in claim 8 wherein each flute includes a flat bottom surface extending from one side of the bit past the bit axis and joining said first wall.

10. An insulation stripping tool as in claim 8 wherein said bore includes a first portion at the cutting head and a second portion remote from the cutting head, the diameter of said first portion being less than the diameter of said second portion.

* * * * *